United States Patent [19]

Smith

[11] Patent Number: 5,236,996

[45] Date of Patent: * Aug. 17, 1993

[54] STABLE POLYAMIDE RESIN DISPERSIONS CONTAINING PIPERASINE AND METHODS FOR THE MANUFACTURE THEREOF

[75] Inventor: George A. Smith, Newtown, Pa.

[73] Assignee: Union Camp Corporation, Wayne, N.J.

[*] Notice: The portion of the term of this patent subsequent to Mar. 10, 2009 has been disclaimed.

[21] Appl. No.: 734,838

[22] Filed: Jul. 24, 1991

[51] Int. Cl.$^5$ .............................. C08J 3/02; C08J 3/05; C08G 69/28; C08K 5/16
[52] U.S. Cl. ........................... 524/608; 524/238; 524/239; 524/240; 524/606; 524/608; 524/801; 523/337; 528/310; 528/328
[58] Field of Search ...................... 524/238, 608, 801; 523/337; 528/310

[56] References Cited

U.S. PATENT DOCUMENTS

| | | | |
|---|---|---|---|
| 3,879,324 | 4/1992 | Timmons et al. | 260/29.2 EP |
| 3,917,817 | 11/1975 | Vanlerberghe et al. | 524/608 |
| 5,025,043 | 6/1991 | Smith | 524/608 |
| 5,095,058 | 3/1992 | Smith et al. | 524/238 |

FOREIGN PATENT DOCUMENTS

| | | |
|---|---|---|
| 738340 | 5/1953 | United Kingdom . |
| 1275389 | 5/1972 | United Kingdom . |

OTHER PUBLICATIONS

07/674,846, Mar. 25, 1991, Smith.

*Primary Examiner*—Paul R. Michl
*Assistant Examiner*—Andrew E. C. Merriam
*Attorney, Agent, or Firm*—William K. Wissing

[57] ABSTRACT

Stable aqueous dispersions of finely divided piperazine-containing polyamide resin particles and methods for the manufacture thereof are provided. Dispersions according to this invention find use in hot melt adhesives, coatings, inks, and the like.

52 Claims, No Drawings

STABLE POLYAMIDE RESIN DISPERSIONS CONTAINING PIPERASINE AND METHODS FOR THE MANUFACTURE THEREOF

FIELD OF THE INVENTION

This invention relates to stable, aqueous dispersions of finely divided polyamide resin particles containing piperazine and methods for the manufacture thereof.

BACKGROUND OF THE INVENTION

Polyamide resins are well known as a class of resins, as are numerous methods for their preparation. Polyamide resins are typically manufactured by reacting a di- or polyfunctional amine with a di- or polyfunctional acid. Most of the commonly-employed diacids and diamines yield polyamide resins which are essentially linear.

The properties of polyamide resins will vary considerably, depending upon the particular synthetic reactants employed. Polyamide resins which are prepared from relatively short chain diacids and diamines having, for example, 5-10 carbon atoms will tend to be relatively crystalline and have excellent fiber forming properties. These types of polyamide resins are typically referred to as nylons.

Polyamide resins are also prepared from relatively long chain polyfunctional acids and diamines. A particularly important class of polyamide resins of this type are referred to as polymerized fatty acid polyamide resins. The polymerized fatty acid polyamide resins are especially useful in products such as hot melt adhesives, water resistant coatings, and binders for printing inks, because of their physical properties, including high strength, excellent flexibility, water and solvent resistance, and the ability to form smooth, non-tacky coatings and films.

The polyfunctional acids used in the preparation of polymerized fatty acid polyamide resins are derived from higher molecular weight unsaturated fatty acids by polymerization. In the polymerization process, the fatty acids having double bond functionalities combine to produce mixtures of higher molecular weight polymeric acids.

The polymerized fatty acid polyamide resins are, in turn, typically prepared by reacting one or more suitable diamines—most commonly relatively short chain diamines—with the polymerized fatty acid. Often, another diacid is also reacted to increase the softening point, tensile strength, or other properties. The polymerized fatty acid polyamide resins which are obtained tend to be more amorphous than the nylon types of polyamides resins and are generally more flexible. The differences in the physical properties of the polymerized fatty acid polyamide resins as compared to the nylon types of polyamide resins are related to the long chain length and structural variations of the polymerized fatty acid component.

One of the problems encountered with the polyamide resins—particularly the polymeric fatty acid polyamides—relates to the methods used to apply the resins to substrates. One method which has been used involves heating the polyamide resins above their melting point and then applying the molten resins to the substrate. This technique, however, has certain inherent problems. For example, polyamide resins typically have high melting points, often higher than the distortion temperatures of the substrates onto which they are to be applied. Accordingly, the hot melt method can only be used in certain limited applications which require relatively expensive application equipment. Thus, the use of molten polyamide resins is not practical in applications such as, for example, printing and coating. Molten polyamide resins are also impractical where the resin is to be applied as a latent hot melt layer to be activated at a later time.

It has been recognized that certain of the problems associated with the polyamide resins might be solved if the polyamides could be applied at ambient temperatures as solutions or dispersions. For many applications, however, solutions of polyamide resins are unsatisfactory. Polyamide resins as a class have excellent resistance to solvents; even with respect to those solvents in which the polyamide resins are soluble, the solubility typically is relatively low. Furthermore, the solvents which have been used to make polyamide resin solutions often adversely react with the substrates to which the polyamide resin solutions are applied. Further problems associated with solvent solutions are that most solvents used are relatively expensive, often difficult or impossible to remove from the applied coatings, and present fire, toxicity, and environmental pollution problems.

To overcome or at least reduce the problems associated with such solvent-based systems, it has been suggested to prepare emulsions or dispersions of the polyamide resins in water. Early emulsions were prepared by initially dissolving the polyamide resin in an organic solvent and then using selected emulsification agents to form an emulsion of the solvent solution and water. However, the resulting solvent/water/polyamide resin emulsions still had the problems associated with the presence of solvents and were relatively unstable. Those skilled in the art will appreciate that instability is manifested in aqueous resin emulsions or dispersions by phenomena such as phase separation, creaming, coalescence, flocculation, or gelation. Films formed from solvent-containing emulsions also tended to have an undesirable tackiness.

In British patent 1,491,136 there was disclosed a method for forming aqueous dispersions of various plastic powders, including polyamide resin powders. In the disclosed method, the polyamide resin was first mechanically reduced to a powder form and then blended with water and a thickening agent. The method was less than satisfactory. The mechanical reduction of the resins to the required particle size was both expensive and difficult to control, especially for flexible polymers, and often caused thermal degradation of the polymers. Furthermore, the resulting thickened dispersions had limited utility in many applications because of the relatively high viscosity due to the thickening agent.

It is also known to render a polyamide resin more readily dispersible in water by chemically modifying the resin so as to include solubilizing groups. This includes, for example, incorporating alkoxymethyl groups, as disclosed in U.S. Pat. No. 2,430,860 (Carirns) and U.S. Pat. No. 2,714,075 (Watson, et al.). However, the incorporation of the additional groups into the polyamide resin increases the cost of the polymer and also typically reduces the desirable properties of the polyamide resins, especially in relation to water and solvent resistance.

Another known method for increasing the water dispersibility of polyamide resins involves formation of a resin having a considerable excess of either free carboxyl or free amine groups. At least a portion of the free acid or free amine groups are then neutralized to form salt groups on the polyamide resin, which salt groups act as internal surfactants to facilitate the dispersion of the modified polyamide in water. In U.S. Pat. No. 2,811,459 (Wittcoff, et al.) there is disclosed a method for preparing polymerized fatty acid polyamide dispersions wherein the polyamide is formed from a substantial excess of a diamine. The resulting polyamide resins are then dispersed in an aqueous solution of an acid so that the acid forms ammonium salt groups which act as internal surfactants which allow formation of an aqueous dispersion. In U.S. Pat. No. 2,768,090 (Wittcoff, et al.) a similar process is disclosed wherein the excess amine groups of a polyamide resin are reacted with an acid to form intrinsic ammonium salt groups and, hence, a cationic dispersion which is converted to an anionic dispersion by charge inversion. A similar salt forming process utilizing free amino groups was disclosed in U.S. Pat. No. 2,824,848 (Wittcoff). In U.S. Pat. No. 2,926,117 (Wittcoff) there is disclosed a method wherein the polyamide resin formed with a deliberate excess of acid groups is then dispersed in an aqueous medium containing an alkaline substance to cause formation of carboxylate salt groups which act as internal surfactants.

The discussed methods for preparing aqueous dispersions of polymerized fatty acid polyamides having salt groups are relatively effective in initially forming aqueous dispersions. However, the dispersions have limited stability and are not satisfactory for use in many applications, as their synthesis requires the presence of substantial amounts of free acid or free amine groups which adversely effect the performance properties of the dispersed polyamide resin. Optimal properties are typically achieved by conducting the amidations so as to cause as complete a reaction as possible. This requires that approximately stoichiometric amounts of the starting diacid and diamine be employed and that the reaction be conducted so as to produce a final product having a low amine number and low acid number. The presence of substantial excesses of either reactant or an incomplete reaction—as required for the prior art salt forming polyamide material—inherently reduces the chain length and the resulting strength and flexibility of the polyamide resin.

Furthermore, incorporation of polymers having substantial excess amounts of unreacted polymerized fatty acids typically results in unstable materials. The fatty acids can be liberated from the polymer and cause exceptional tackiness and undesirable degradation of the desired properties of the polyamide resin. These polyamide resins continue to react during application, which causes increases in molecular weight and coating viscosity, as well as changes in the melting point. A still further problem encountered with the method wherein the salt forms of the polyamide resins are used is that the salts tend to decompose during application and the resulting material becomes undesirably tacky when applied. This is particularly undesirable in many applications, such as in printing inks and protective coatings.

Certain of the problems associated with aqueous polyamide resin dispersions can be obviated by the methods disclosed in U.S. Pat. No. 4,886,844 (Hayes) for the preparation of stable aqueous dispersions of nonsolvated, un-neutralized, polymerized fatty acid polyamide resins having low acid and amine number. As disclosed therein, molten resin, water, and a surfactant are subjected to sufficient comminuting forces to form an emulsion in which resin droplets have a volume average size distribution of about 20 microns or less.

SUMMARY OF THE INVENTION

The present invention provides stable, aqueous dispersions of finely divided, piperazine-containing polyamide resin (PCPR) particles dispersed in water, which dispersions have low viscosity and a volume average particle size distribution of less than about 20 microns. Specifically, the aqueous polyamide dispersions of the present invention are stable against phase separation and gelation.

The dispersions of the present invention are produced by first forming a water-in-oil emulsion by mixing together at a first temperature the PCPR, water, at least one surfactant, and optionally a neutralizing acid or base, wherein the water and surfactant are present in amounts effective to form the water-in-oil emulsion, and the neutralizing acid or base is present, when used, in an amount effective to neutralize any residual acid or base on the PCPR. The first temperature is effective to liquify the PCPR and to maintain an oil phase of a water and oil emulsion as a liquid. The aqueous dispersions are then formed by mixing together at a second temperature less than the first temperature the water-in-oil emulsion and a second amount of water effective to form an oil-in-water emulsion. The oil-in-water emulsion is then cooled to a third temperature effective to form the aqueous dispersion. At least one water soluble, dipolar chemical moiety is added to either the oil-in-water emulsion at the second temperature or to the aqueous dispersion in an amount effective to stabilize the aqueous dispersion.

The resulting stable, aqueous dispersions of the PCPRs which are obtained are especially useful when applied as coatings for hot-melt adhesive applications, or utilized in coatings, inks, and the like.

DETAILED DESCRIPTION OF THE INVENTION

Those skilled in the art will appreciate that emulsions of polyamide resin in water, more commonly known as oil-in-water emulsions, are to be contrasted with emulsions of water in resin, which emulsions are more commonly known as water-in-oil emulsions. Techniques for converting water-in-oil emulsions to oil-in-water emulsions are generally known to those skilled in the art as inversions. The water added to invert an emulsion is known as inversion water. The conversion of an oil-in-water emulsion to a water-in-oil emulsion is also known as an inversion. The term "oil phase" as referred to herein is understood to mean that phase of either the water-in-oil or the oil-in-water emulsion which includes the PCPR and at least one surfactant.

It will be appreciated that there exist numerous types of polyamide resins which can be employed to form aqueous dispersions according to the present invention. The terms "polyamide resin" or "resin" as employed herein are intended to include compositions comprising individual, chemically distinct polymerized fatty acid polyamide resins as well as blends thereof. Polyamide resins can be obtained commercially or can be prepared by generally well known methods.

The term "polymerized fatty acid" is intended to be generic in nature and to refer to polymerized acids obtained from fatty acids. The term "fatty acids" refers to saturated, ethylenically unsaturated and acetylenically unsaturated, naturally occurring and synthetic monobasic aliphatic carboxylic acids which contain from about 8 to about 24 carbon atoms. While specific references are made in this application to polymerized fatty acid polyamide resins which are obtained from $C_{18}$ fatty acids, it will be appreciated that the methods of this invention can likewise be employed with other polymerized fatty acid polyamides.

The preferred starting acids for the preparation of the polymerized fatty acids used in this invention are oleic and linoleic acids, due to their ready availability and relative ease of polymerization. Mixtures of oleic and linoleic acids are found in tall oil fatty acids, which are a convenient commercial source of these acids. Fatty acids can be polymerized using various well known catalytic and noncatalytic polymerization methods. A typical composition of the polymerized $C_{18}$ a tall oil fatty acids which are used as the starting materials for the polyamide resins used in the present invention is:

| | | |
|---|---|---|
| $C_{18}$ | monobasic acids (monomer) | 0–15% by wt. |
| $C_{36}$ | dibasic acids (dimer) | 60–95% by wt. |
| $C_{54}$ | (or higher) trimer acid or polybasic acids | 0.2–35% by wt. |

In preparing polymerized fatty acid polyamide resins for use in the present invention, it is preferable that the starting polymerized fatty acid contain as high a percentage as possible of the dimer ($C_{36}$ dibasic) acid in order to obtain optimum physical properties in the final product.

In addition to the polymerized fatty acids, a wide variety of dicarboxylic acids can be used to prepare polymerized fatty acid polyamide resins, including aliphatic, cycloaliphatic, and aromatic dicarboxylic acids. Representative of such acids—which may contain from 2 to 22 carbon atoms—are oxalic, glutaric, malonic, adipic, succinic, suberic, sebacic, azelaic, pimelic, terephthalic, isophthalic, dodecanedioic and phthalic acids, naphthalene dicarboxylic acids, and 1,4- or 1,3-cyclohexane dicarboxylic acids. Preferred dicarboxylic acids employed in the invention are straight chain aliphatic diacids having at least 6 carbon atoms and more preferably 6 to about 22 carbon atoms such as azelaic, sebacic, and dodecanedioic dicarboxylic acids. It should be understood that use of the corresponding acid anhydrides, esters, and acid chlorides of these acids is included in the term "dicarboxylic acid". These acids and anhydrides are readily available from commercial sources and methods for their preparation are well known.

Monocarboxylic acids may be added to control molecular weight. Preferred monocarboxylic acids are linear and have 2 to 22 carbon atoms. Most preferred are stearic, tall oil fatty and oleic acids.

Piperazine and at least one other diamine are used in the preparation of the polymerized fatty acid polyamide resins employed in the present invention. The at least one other diamine may be one or more of the known aliphatic, cycloaliphatic or aromatic diamines having from about 2 to about 20 carbon atoms. Preferred are the alkylene diamines, such as ethylene diamine, 1,3-diaminopropane, 1,4-diaminobutane, terephthalyl diamine, known as p-xylene diamine, 1,6-hexamethylene diamine, bis-(4-cyclohexylamine)methane, 2,2-bis-(4-cyclohexylamine)propane, polyglycol diamines, isophorone diamine, isophthalyl diamine, known as m-xylene diamine, cyclohexanebis(methylamines), 1,4-bis(2'-aminoethyl)benzene, dimer diamine, polyether diamines and methyl pentamethylene diamine. These diamine compounds are all prepared by well known methods and many are commercially available. Particularly preferred are the straight chain aliphatic diamines of 2 to about 20 carbons atoms, especially ethylene diamine and hexamethylene diamine, and cycloaliphatic diamines, especially 4,4'-methylenebis(cyclohexylamine).

In the method of the present invention, it is desirable to use as the polymerized fatty acid polyamide a material which is the result of as complete an amidation reaction as possible between the starting polymerized fatty acid, piperazine and the at least one other diamine. Those skilled in the art will recognize that the degree of completion of the amidation process can be determined by evaluating the acid number and the amine number of the final polymer. Ideally, the amine or the acid numbers, depending upon which is in lower stoichiometric amounts, of the PCPR employed should be zero (0). However, it is often difficult, if not impossible, to reach complete reaction, and this value should be one or less. It has been found, however, that polymerized fatty acid PCPRs having relatively low amine numbers of, for example, up to about 10 and relatively low acid numbers of up to about 12 are especially useful in the present invention.

The number of free acid groups and free amine groups present in the polymerized fatty acid PCPR are directly related to the relative amount of the polymeric fatty acids, dicarboxylic acids, piperazine and other diamines involved in the polymerization reaction and the degree of completion of the reaction. For the above reasons, approximately stoichiometric amounts of the polymerized fatty acids plus the dicarboxylic acids and piperazine plus the other diamines, based on the total number of available acid and amine groups, should be used to prepare the PCPRs for this invention, and the reaction conditions should be selected to ensure completion or substantial completion of the amidation reaction. The reaction conditions required for the amidation reaction are generally well known in the art, with the reaction being generally conducted at temperatures from about 100° C. to about 300° C. for from about 1 to about 8 hours. The use of acid catalysts, such as phosphoric acid, and vacuum can be used, especially in the latter part of the reaction, to yield a more complete amidation reaction.

It will be appreciated that a wide variety of water soluble surfactants can be employed successfully in preparing dispersions of the present invention, in part because of the relative neutral charge of most polymerized fatty acid PCPRs. The surfactant or combination of surfactants which are preferred in the process of this invention are ones which will promote the emulsification of the molten PCPR and the water and which will also act to stabilize the final dispersion of the PCPR particles in the water. Those skilled in the art will recognize that the choice of a surfactant will depend intimately upon the particular PCPR employed. The surfactants which are selected are those which are capable as acting either as oil-in-water or water-in-oil emulsifying agents for the PCPR-water mixture. The surfactants include all well known anionic, polar and non-polar non-ionic, amphoteric, and cationic surfactants.

Among the surfactants which have been found to be especially useful are the non-ionic surfactants Tergitol ™ NP-40 and Tergitol ™ 15-S-40 (Union Carbide, Danbury, Conn.) and Igepal ™ CO-850 and Igepal ™ CO-870 (GAF Corporation, Wayne, N.J.).

While all surfactants are not suitable for use in the method of the present invention, it has been found that a wide range of surfactants are suitable. It is relatively simple to screen suitable surfactants for use in the presence of this invention. It was found for certain embodiments, for example, that the preferred surfactants are those which exhibit outstanding ability to cause the emulsification of the water in the liquified PCPR. These surfactants must also have the ability to form emulsions of the liquified PCPR in the water upon inversion of the water-in-oil emulsion. These surfactants are typically also highly effective for imparting long term stability to the final dispersion. The relative amount of the employed surfactant added is based upon the amount of the polymerized fatty acid PCPR which is to be present in the final dispersion and upon the particular surfactant used. It has been found, however, that optimum results are obtained when the surfactant is used in an amount from about 0.05% to about 10% by weight, based on the weight of the polymerized fatty acid polyamide resin.

It is believed that an effective amount of piperazine allows either the homogeneous mixture of liquified PCPR and surfactant or the water-in-oil emulsion to be cooled below the ring and ball softening point of the neat PCPR, while still maintaining the oil phase of the emulsion in the liquid state. The "melting point of the oil phase" is that temperature below which the resin droplets solidify to form the aqueous dispersion. This allows the inversion of the water-in-oil emulsion to the oil-in-water emulsion to occur below the ring and ball softening point of the neat PCPR. The PCPR preferably contains from about 1-30 weight percent of piperazine, and more preferably from about 5-20 weight percent of piperazine.

It will be appreciated that polyamide resins typically contain residual acid or base attributable to the synthetic source of the resin. While it is preferred that aqueous dispersions be formed from polymerized fatty acid PCPRs which have relatively low (i.e., less than about 12) acid or amine numbers, aqueous dispersions have been formed from PCPRs with acid numbers up to about 45 and amine numbers up to about 250. It will be appreciated that acid number represents the titratable acid present in a gram of resin expressed in terms of milligrams potassium hydroxide required to neutralize that amount of acid. Likewise, amine number represents the acid titratable amine groups present in a gram of resin expressed in terms of equivalent milligrams potassium hydroxide.

It is preferred in accordance with this invention that a PCPR's residual acid or base be neutralized to some empirically determined level prior to formation of aqueous dispersions. The preferred degree of neutralization will vary from resin to resin and will be manifested by incremental improvement in the performance properties of aqueous dispersions prepared therefrom. Preferred neutralizing bases are potassium hydroxide, sodium hydroxide, ammonium hydroxide, and ethanolamines. Preferred neutralizing acids are acetic acid, hydrochloric acid, sulfuric acid, and phosphoric acid.

A wide variety of water soluble, dipolar chemical moieties, such as amino acids, may be incorporated into aqueous dispersions of polyamide resin in accordance with this invention, so long as they possess sufficient amphoteric character to stabilize the dispersions. It will be appreciated that the amphoteric character of an amino acid relates to the degree to which its constituent molecules possess points having opposite charges.

The water soluble, dipolar chemical moieties used in the process of this invention are selected from the group consisting of amino acids of the formula

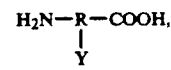

anionic and cationic salts derived therefrom and mixtures thereof, wherein R represents an alkyl, alkenyl or aryl group having up to 10 carbon atoms and Y is a polar or non-polar ionic, or non-ionic substituent. Examples of such amino acids are p-aminobenzoic acid, glycine, lysine, arginine, phenylalanine and serine. Most preferred are glycine and p-aminobenzoic acid.

In preferred embodiments of the methods for preparing the stable, aqueous dispersions of the present invention, a solid PCPR is heated substantially in the absence of oxygen to a temperature at least as high as its melting point to liquify the PCPR.

This liquification process is preferably conducted in a closed vessel under a protective blanket of nitrogen. The melting temperature of the polymerized fatty acid PCPR will vary considerably depending upon the particular starting reactants employed to prepare the PCPR. Typically, however, polyamides will melt in the temperature range from about 100° C. to 200° C. If the temperature to which the molten PCPR will be heated for liquification is above the boiling point of water, the process equipment used in the method of the present invention must be capable of being operated at elevated pressures and temperatures.

A homogeneous mixture of the liquified PCPR, water and surfactant is then formed by mixing together the liquified PCPR, a first amount of water effective to form the homogeneous mixture and at least one surfactant in an amount effective to form a water-in-oil emulsion, at a temperature effective to maintain the oil phase of the emulsion as a liquid. The surfactant may be anionic, cationic, non-ionic or amphoteric and in an amount from about 0.05 to 10% by weight of the polyamide resin.

The water and surfactant may be preheated to a temperature above the melting point of the PCPR in a separate vessel and then added to the liquified PCPR. Preferably, the water and surfactant are added to the liquified PCPR without preheating, at a rate sufficiently slow such that the temperature of the mixture is maintained above the effective temperature as described above. Preferably the water and surfactant are added simultaneously in the form of an aqueous surfactant solution.

In other embodiments, a mixture of PCPR, Water, and surfactant is formed by mixing the solid PCPR, a first amount of water effective to form the mixture and at least one surfactant in an amount effective to form a water-in-oil emulsion upon liquification of the PCPR. The mixture is then heated to a first temperature above the melting point of the oil phase, which temperature is effective to liquify the PCPR in the mixture to form a homogeneous mixture of the liquified PCPR, water and at least one surfactant.

A water-in-oil emulsion is then formed by mixing with the homogeneous mixture a second amount of water effective to form the water-in-oil emulsion comprising from about 5 to 50% by weight of the emulsion, said second amount of water optionally including an amount of acid or base effective to neutralize residual acid or base on the PCPR.

In the most preferred embodiment, the temperature of the homogeneous mixture is cooled to a temperature less than but not more than about 60° C. below the ring and ball softening point of the PCPR, said temperature also being above the melting point of the oil phase. A solution of the neutralizing acid or base and an amount of water effective to form the water-in-oil emulsion is then added to the homogeneous mixture at a rate sufficiently low so that the temperature remains substantially unchanged.

In alternate embodiments, the aqueous neutralizing solution of acid or base is added to the homogeneous mixture before cooling the mixture. The aqueous acid or base solution preferably is added at a rate sufficiently slow so as to maintain the temperature of the mixture greater than the melting point of the oil phase. In other embodiments, the aqueous neutralizing solution of acid or base is heated in a separate vessel to a temperature which is at least as high as the melting point of the oil phase. More preferably, the acid or base solution is heated to a temperature at least slightly higher than the melting point of the oil phase. Under these conditions it may be required to heat the solution and maintain it under pressure in order to reach a temperature higher than the melting point of the oil phase. Alternatively, the acid or base solution is heated to a temperature somewhat below the temperature of the homogeneous mixture and the homogeneous mixture is heated to a temperature significantly above the melting point of the oil phase, such that the resulting blend of aqueous base or acid and homogeneous mixture will have a temperature above the melting point of the oil phase. The blend of the homogeneous mixture and aqueous neutralizing acid or base is then cooled to a temperature less than but not more than about 60° C. below the ring and ball softening point of the PCPR, said temperature also being above the melting point of the oil phase.

The mixture is then subjected to comminuting forces sufficient to form an emulsion in which the droplets of the molten polymerized fatty acid PCPR preferably have a volume average size distribution of less than about 20 microns. The particular type of apparatus used for applying the comminuting force to the blend of the PCPR, water, surfactant and neutralizing acid or base is to some extent a matter of choice and can include apparatus which operates on the basis of shear, impact, or a combination of these process steps. The equipment includes commercially available apparatus such as homogenizers, submicron dispersers, emulsifiers, colloid mills, ultrasonic sound mixers and the like. In general it is preferable for process purposes to run the blend through the comminuting equipment for one pass in that this facilitates the manufacturing process. It should be appreciated, however, that the blend may be sent through the comminuting equipment for a number of passes in order to obtain sufficiently small droplets. In general, the smaller the size of the liquid droplets of an emulsion, the more desirable the dispersion made therefrom. This is true for dispersions prepared by inversion techniques as well.

An oil-in-water emulsion is then formed at a temperature above the melting point of the oil phase and less than but not more than about 60° C. below the ring and ball softening point of the PCPR by mixing with the water-in-oil emulsion a third amount of water effective to form the oil-in-water emulsion, said third amount of water including at least one water soluble, dipolar chemical moiety, as described hereinabove, in an amount effective to stabilize the aqueous dispersion. The oil-in-water emulsion comprises between about 20% and 60% by weight PCPR. The amount of water soluble, dipolar chemical moiety effective to stabilize the aqueous dispersions is preferably from about 0.25% to about 3.0% by weight, based on the weight of the PCPR. In preferred embodiments the inversion water and water soluble, dipolar chemical moiety are heated to a temperature just below the temperature of the water-in-oil emulsion prior to mixing with the water-in-oil emulsion so that the emulsion is not "thermally shocked" such that the liquid PCPR droplets prematurely solidify.

The oil-in-water emulsion is then cooled to a temperature below the melting point of the oil phase to cause the finely divided droplets in the emulsion to solidify into finely divided dispersed particles, thereby forming the aqueous dispersions of the present invention. This cooling step is preferably conducted rapidly so as to prevent coagulation of the particles during the stage of solidification, wherein the droplets become semi-solid and highly adhesive. Cooling of the oil-in-water emulsions prepared at pressures above atmospheric pressure can be rapidly performed by pumping the emulsion through a heat exchanger or the like. Alternatively, the cooling can be effected by rapidly reducing the pressure to cause evaporation of the water. A combination of these techniques can also be employed.

The dispersions of this invention do not require that the starting polymerized fatty acid PCPR initially be completely solvated in a solvent or that the PCPR be formed with excess amine and acid groups to allow for salt formation as is required in the prior art methods of forming dispersions.

It is preferred in accordance with this invention that PCPR dispersions have volume average particle size less than about 20 microns, and more preferably between about 1-20 microns. Those skilled in the art will appreciate that particle size can be determined by a number of methods, such as sedimentation or laser light scattering techniques. Determination of particle size by photon correlation spectroscopy is preferred.

The aqueous dispersions of the present invention preferably comprise from about 20% to 60% by weight PCPR and from about 30% to 70% by weight water. The dispersions also include at least one surfactant selected from the group consisting of anionic, cationic, non-ionic and amphoteric surfactants, said amount preferably being from about 0.05% to about 10% by weight, based on the weight of the polyamide resin. The aqueous dispersions optionally include an amount of acid or base effective to neutralize residual acid or base on the polyamide resin.

The stable, aqueous dispersions of PCPR of the present invention comprise at least one amino acid, as described hereinabove, in an amount effective to stabilize the resulting aqueous dispersions. Most preferred is from about 0.25% to 3.0% by weight glycine, based on the weight of the PCPR. Amino acids may be incorporated as a reactant during formation of the oil-in-water dispersion, or may be incorporated into the dispersion after the formation thereof. It is preferred that the aqueous dispersions contain water soluble, dipolar chemical moieties upon formation.

The PCPR aqueous dispersions of this invention have a viscosity of less than about 3000 cps as measured by a Brookfield viscometer at ambient temperatures, more preferably less than about 500 cps. The solids content of the PCPR dispersions range from about 20-50 percent by weight.

The polymerized fatty acid PCPR aqueous dispersions of this invention can contain various additives in addition to the above-noted materials, such as water soluble alkali metal salts of polymeric organic acids and protective colloids such as lignin derivatives, proteins, water soluble cellulose derivatives, starch, alginic acid, and long chain alcohols and lecithin. The amount of such additives employed can vary in amounts from about 0% to about 5% by weight, based on the weight of the PCPR.

The PCPR dispersion may likewise contain other materials such as viscosity modifiers, plasticizers, dyes, pigments and the like. In this regard, it should be noted that the excellent stability of the polymerized fatty acid PCPR dispersions of this invention allow substantial loadings of additives without adversely affecting the overall stability of the PCPR dispersion.

The stable, aqueous dispersions may be used in, for example, overprint varnishes and aqueous inks, as well as in structural and laminating adhesives.

Additional objects, advantages, and novel features of this invention will become apparent to those skilled in the art upon examination of the following examples thereof, which are not intended to be limiting.

EXAMPLE 1

Thirty-three pounds of a polyamide resin having an acid number of about 10, an amine number of less than 1, a softening point of about 138° C. and containing about 12% piperazine by weight, was charged to a 20 gallon stirred pressure vessel. This was heated to 160° C. with 150 RPM stirring using a 6 inch turbine-type impeller. Once the polymer was completely molten, an aqueous solution containing about 0.9 lbs. Tergitol NP-40 (Union Carbide Corp., Danbury, Conn.), about 0.4 lbs. of 45% aqueous KOH and 8.2 lbs. water was added to form an initial water-in-oil emulsion. This was allowed to mix thoroughly, and then the initial emulsion was slowly cooled to 120° C. To invert the emulsion, an aqueous solution containing about 0.2 lbs. glycine in 91 lbs. of water was heated to 120° C. and added slowly over a 40 minute period. After the water addition, the emulsion was cooled to 40° C. and filtered through a 50 micron bag filter.

The resulting material was a white, creamy dispersion at 25% solids. The Brookfield viscosity of the dispersion at ambient temperature was 129 cps. The dispersion showed excellent storage stability with no signs of thickening or phase separation after 6 months.

EXAMPLE 2

Comparative Example

The procedure used in Example 1 was repeated except that the initial water-in-oil emulsion was inverted at 160° C. The resulting material was a thick paste at 25% solids. The Brookfield viscosity of this material at ambient temperature was greater than 1 million cps.

EXAMPLE 3

Two hundred fifty grams of a polyamide resin having an acid number of about 10, an amine number of less than 1, a softening point of about 138° C. and containing about 8% piperazine by weight, was charged to a 2 liter Parr reactor and heated to 160° C. with 500 RPM stirring. To this was added an aqueous solution containing 17.8 grams Tergitol NP-40, 1.7 grams KOH (85%) and 43.8 grams water. This was allowed to mix to form the initial water-in-oil emulsion. This was then slowly cooled to 120° C. and an aqueous solution containing 1.25 grams glycine dissolved in 700 grams of water was added to invert the initial emulsion. After the water addition, the emulsion was cooled to 40° C. and filtered through a 50 micron bag filter.

The resulting material was a white, creamy dispersion at 25% solids. The Brookfield viscosity of the dispersion at ambient temperature was 245 cps. The dispersion showed excellent storage stability with no signs of thickening or phase separation after 6 months.

EXAMPLE 4

Three hundred grams of a polyamide resin having an acid number of less than 1, an amine number of about 7, a softening point of about 135° C. and containing about 7% piperazine by weight, was charged to a 2 liter Parr reactor and heated to 170° C. with 500 RPM stirring. To this was added an aqueous solution containing 21 grams Tergitol NP-40 (Union Carbide Corp, Danbury, Conn.) dissolved in 75 grams of water to form the initial water-in-oil emulsion. This was slowly cooled to 80° C. and an aqueous solution containing 3 grams glycine in 375 grams water was added to invert the emulsion. After the water addition, the emulsion was cooled to 40° C. and filtered through a 50 micron bag filter.

The resulting material was a white, fluid dispersion at 40% solids having an average volume particle size of about 4 microns. This sample showed good shelf stability with no signs of thickening or phase separation after 4 months. The Brookfield viscosity at ambient temperature was 56 cps.

EXAMPLE 5

Comparative Example 7 The procedure used in Example 4 was repeated except that the initial water-in-oil emulsion was inverted at 140° C. In this case, no dispersion was formed.

What is claimed is:

1. A method for preparing a stable, aqueous dispersion of a piperazine-containing polyamide resin, comprising the ordered steps of:
   (a) forming a water-in-oil emulsion by mixing together at a first temperature:
      a piperazine-containing polyamide resin;
      water; and
      at least one surfactant;
      said water and surfactant being present in amounts effective to form the water-in-oil emulsion, and said first temperature being effective to liquify the piperazine-containing polyamide resin and to maintain an oil phase of a water and oil emulsion as a liquid; and
   (b) forming an aqueous dispersion by:
      mixing together at a second temperature less than said first temperature the water-in-oil emulsion and a second amount of water effective to form an oil-in-water emulsion;
      cooling the oil-in-water emulsion to a third temperature effective to form the aqueous dispersion; and adding to the oil-in-water emulsion at the second temperature, or to the aqueous dispersion, at least one water soluble, dipolar chemical moiety in an amount effective to stabilize the aqueous dispersion, said water soluble, dipolar chemical moiety being selected from the group consisting of amino acid of the formula

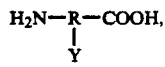

anionic and cationic salts derived therefrom and mixtures thereof, wherein R represents an alkyl, alkenyl, or aryl group having up to 10 carbon atoms and Y is a polar or non-polar, ionic or non-ionic substituent.

2. The method of claim 1 further comprising mixing with the piperazine-containing polyamide resin, water and surfactant in step (a) a neutralizing acid or base in an amount effective to neutralize residual acid or base on the piperazine-containing polyamide resin.

3. The method of claim 1 Wherein the surfactant is selected from the group consisting of anionic, cationic, non-ionic, and amphoteric surfactants.

4. The method of claim 1 wherein the amount of surfactant effective to form the water-in-oil emulsion is from about 0.05% to about 10% by weight, based on the weight of the polyamide resin.

5. The method of claim 1 wherein said piperazine-containing polyamide resin contains from about 1–30 weight percent of piperazine.

6. The method of claim 5 wherein said piperazine-containing polyamide resin contains from about 5–20 weight percent of piperazine.

7. The method of claim 1 wherein the water soluble, dipolar chemical moiety is selected from the group consisting of p-aminobenzoic acid and glycine.

8. The method of claim 1 wherein the amount of the water soluble, dipolar chemical moiety effective to stabilize the aqueous dispersion is from about 0.25% to about 3.0% by weight, based on the weight of polyamide resin.

9. The method of claim 1 wherein the water-in-oil emulsion comprises from about 5% to about 50% by weight of water.

10. The method of claim 1 wherein the oil-in-water emulsion comprises from about 20% to about 60% by weight of piperazine-containing polyamide resin.

11. The method of claim 1 wherein the aqueous dispersion comprises solid, dispersed piperazine-containing polyamide resin particles having a volume average size distribution of less than about 20 microns.

12. The method of claim 11 wherein the aqueous dispersion comprises solid, dispersed piperazine-containing polyamide resin particles having a volume average size distribution of between about 1–20 microns.

13. The method of claim 1 wherein the first temperature is at least as high as the melting point of the oil phase.

14. The method of claim 1 wherein the second temperature is above the melting point of the oil phase and less than but not more than 60° C. below the softening point of the piperazine-containing polyamide resin.

15. The method of claim 1 wherein the third temperature is below the melting point of the oil phase.

16. The aqueous dispersion prepared according to claim 1.

17. A process for preparing a stable, aqueous dispersion of a polyamide resin, comprising the ordered steps of:
(a) heating a piperazine-containing polyamide resin substantially in the absence of oxygen to a first temperature at least as high as its melting point t liquify the resin;
(b) forming a homogeneous mixture of the liquid piperazine-containing polyamide resin, water and at least one surfactant by mixing together, at a second temperature less than the first temperature and effective to maintain an oil phase of a water and oil emulsion as a liquid,
the liquified piperazine-containing polyamide resin;
a first amount of water effective to form the homogeneous mixture; and
at least one surfactant in an amount effective to form a water-in-oil emulsion;
(c) mixing with the homogeneous mixture a second amount of water effective to form a water-in-oil emulsion, said second amount of water including an amount of acid or base effective to neutralize residual acid or base on the polyamide resin;
(d) mixing with the water-in-oil emulsion at a third temperature a third amount of water effective to form an oil-in-water emulsion, said third amount of water including at least one water soluble, dipolar chemical moiety in an amount effective to stabilize the aqueous dispersion, said water soluble, dipolar chemical moiety being selected from the group consisting of amino acids of the formula

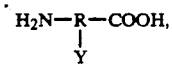

anionic and cationic salts derived therefrom and mixtures thereof, wherein R represents an alkyl, alkenyl or aryl group having up to 10 carbon atoms, Y is a polar or non-polar, ionic or nonionic substituent;
said third temperature being above the melting point of the oil phase and less than but not more than about 60° C. below the softening point of the piperazine-containing polyamide resin; and
(e) cooling the oil-in-water emulsion to a fourth temperature below the melting point of the oil phase to form the aqueous dispersion.

18. The method of claim 17 wherein the surfactant is selected from the group consisting of anionic, cationic, non-ionic, and amphoteric surfactants.

19. The method of claim 17 wherein the amount of surfactant effective to form the water-in-oil emulsion is from about 0.05% to about 10% by weight, based on the weight of the polyamide resin.

20. The method of claim 17 wherein said piperazine-containing polyamide resin contains from about 1–30 weight percent of piperazine.

21. The method of claim 17 Wherein said piperazine-containing polyamide resin contains from about 5–20 weight percent of piperazine.

22. The method of claim 17 wherein the water soluble, dipolar chemical moiety is selected from the group consisting of p-aminobenzoic acid and glycine.

23. The method of claim 17 wherein the amount of the water soluble, dipolar chemical moiety effective to stabilize the aqueous dispersion is from about 0.25% to about 3.0% by weight, based on the weight of piperazine-containing polyamide resin.

24. The method of claim 17 wherein the water-in-oil emulsion comprises from about 5% to about 50% by weight of water.

25. The method of claim 17 wherein the oil-in-water emulsion comprises from about 20% to about 60% by weight of piperazine-containing polyamide resin.

26. The method of claim 17 wherein the aqueous dispersion comprises solid, dispersed piperazine-containing polyamide resin particles having a volume average size distribution of less than about 20 microns.

27. The method of claim 17 wherein the aqueous dispersion comprises solid, dispersed piperazine-containing polyamide resin particles having a volume average size distribution of between about 1-20 microns.

28. The aqueous dispersion prepared according to claim 17.

29. A process for preparing a stable, aqueous dispersion of a piperazine-containing polyamide resin, comprising the ordered steps of:
 (a) forming a mixture of a piperazine-containing polyamide resin, water and surfactant by mixing:
  a piperazine-containing polyamide resin;
  a first amount of water effective to form the mixture; and
  at least one surfactant in an amount effective to form a water-in-oil emulsion upon liquification of the piperazine-containing polyamide resin;
 (b) heating the mixture to a first temperature above the melting point of an oil phase of a water and oil emulsion, said first temperature being effective to liquify the piperazine-containing polyamide resin in the mixture to form a homogeneous mixture of liquified piperazine-containing polyamide resin, water and at least one surfactant;
 (c) mixing with the homogeneous mixture a second amount of water effective to form a water-in-oil emulsion, said second amount of water including an amount of acid or base effective to neutralize residual acid or base on the piperazine-containing polyamide resin;
 (d) mixing with the water-in-oil emulsion at a second temperature less than the first temperature a third amount of water effective to form an oil-in-water emulsion, said third amount of water including at least one water soluble, dipolar chemical moiety in an amount effective to stabilize the aqueous dispersion, said water soluble, dipolar chemical moiety being selected from the group consisting of amino acid of the formula

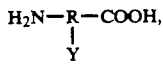

anionic and cationic salts derived therefrom and mixtures thereof, wherein R represents an alkyl, alkenyl or aryl group having up to 10 carbon atoms, Y is a polar or non-polar, ionic or non-ionic substituent;
  said second temperature being above the melting point of the oil phase and less than but not more than about 60° C. below the softening point of the piperazine-containing polyamide resin; and
 (e) cooling the oil-in-water emulsion to a third temperature below the melting point of the oil phase to form the aqueous dispersion.

30. The method of claim 29 wherein the surfactant is selected from the group consisting of anionic, cationic, non-ionic, and amphoteric surfactants.

31. The method of claim 29 wherein the amount of surfactant effective to form the water-in-oil emulsion is from about 0.05% to about 10% by weight, based on the weight of the polyamide resin.

32. The method of claim 29 wherein said piperazine-containing polyamide resin contains from about 1-30 weight percent of piperazine.

33. The method of claim 29 wherein said piperazine-containing polyamine resin contains from about 5-20 weight percent of piperazine.

34. The method of claim 29 wherein the water soluble, dipolar chemical moiety is selected from the group consisting of p-aminobenzoic acid and glycine.

35. The method of claim 29 wherein the amount of the water soluble, dipolar chemical moiety effective to stabilize the aqueous dispersion is from about 0.25% to about 3.0% by weight, based on the weight of polyamide resin.

36. The method of claim 29 wherein the water-in-oil emulsion comprises from about 5% to about 50% by weight of water.

37. The method of claim 29 wherein the oil-in-water emulsion comprises from about 20% to about 60% by weight of piperazine-containing polyamide resin.

38. The method of claim 29 wherein the aqueous dispersion comprises solid, dispersed piperazine-containing polyamide resin particles having a volume average size distribution of less than about 20 microns.

39. The method of claim 29 wherein the aqueous dispersion comprises solid, dispersed piperazine-containing polyamide resin particles having a volume 40. The aqueous dispersion prepared according to claim 29.

41. A stable, aqueous dispersion of piperazine-containing polyamide resin particles in water, comprising:
 between about 20% and about 60% by weight piperazine-containing polyamide resin which contains from about 1% to about 30% by weight of piperazine and at least one one diamine selected from the group consisting of aliphatic, cycloaliphatic and aromatic diamines;
 between about 30% and about 70% by weight water;
 at least one surfactant in an amount effective to form a water-in-oil emulsion upon liquification of the piperazine-containing polyamide resin; and
 at least one water soluble, dipolar chemical moiety in an amount effective to stabilize the aqueous dispersion, said water soluble, dipolar chemical moiety being selected from the group consisting of amino acid of the formula

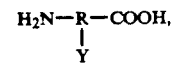

anionic and cationic salts derived therefrom and mixtures thereof, whereby R represents an alkyl, alkenyl or aryl group having up to 10 carbon atoms and Y is a polar or non-polar, ionic or non-ionic substituent.

42. The aqueous dispersion of claim 41 further comprising an amount of acid or base effective to neutralize residual acid or base on the piperazine-containing polyamide resin.

43. The aqueous dispersion of claim 41 Wherein the surfactant is selected from the group consisting of anionic, cationic, non-ionic, and amphoteric surfactants.

44. The aqueous dispersion of claim 41 wherein the amount of surfactant effective to form the water-in-oil emulsion is from about 0.05% to about 10% by weight, based on the weight of the polyamide resin.

45. The aqueous dispersion of claim 41 wherein the piperazine-containing polyamide resin contains from about 5-20 weight percent of piperazine.

46. The aqueous dispersion of claim 41 wherein the water soluble, dipolar chemical moiety is selected from the group consisting of p-aminobenzoic acid and glycine.

47. The aqueous dispersion of claim 41 wherein the amount of the water soluble, dipolar chemical moiety effective to stabilize the aqueous dispersion is from about 0.25% to about 3.0% by weight, based on the weight of polyamide resin.

48. The aqueous dispersion of claim 41 wherein the piperazine-containing polyamide resin particles have a volume average size distribution of less than about 20 microns.

49. The aqueous dispersion of claim 41 wherein the piperazine-containing polyamide resin particles have a volume average size distribution of between about 1-20 microns.

50. The aqueous dispersion of claim 41 having a Brookfield viscosity at ambient temperature of less than about 3000 cps.

51. The aqueous dispersion of claim 41 having a Brookfield viscosity at ambient temperatures of less than about 500 cps.

52. A stable, aqueous dispersion of piperazine-containing polyamide resin particles in water, comprising:
between about 20% and about 60% by weight of a piperazine-containing polyamide resin containing from about 1-30 weight percent of piperazine;
between about 30% and about 70% by weight water;
between about 0.05% and about 10% by weight, based on the weight of the piperazine-containing polyamide resin, of at least one surfactant selected from the group consisting of anionic, cationic, non-ionic and amphoteric surfactants;
an amount of acid or base effective to neutralize residual acid or base on the polyamide resin; and
between about 0.25% and about 3.0% by weight, based on the weight of piperazine-containing polyamide resin, of at least one water soluble, dipolar chemical moiety selected from the group consisting of amino acid of the formula

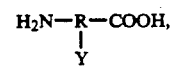

anionic and cationic salts derived therefrom and mixtures thereof, wherein R represents an alkyl, alkenyl or aryl group having up to 10 carbon atoms and Y is a polar or non-polar, ionic or non-ionic substituent;
said piperazine-containing polyamide resin particles having a volume average size distribution of between about 1-20 microns, and said aqueous dispersion having a Brookfield viscosity at ambient temperature of less than about 3000 cps.

* * * * *

UNITED STATES PATENT AND TRADEMARK OFFICE
CERTIFICATE OF CORRECTION

PATENT NO. : 5,236,996
DATED : August 17, 1993
INVENTOR(S) : George A. Smith

It is certified that error appears in the above-identified patent and that said Letters Patent is hereby corrected as shown below:

Column 16, Claim 39, line 34; after "volume" insert

--average size distribution of between about 1-20 microns. --

Signed and Sealed this

Twenty-sixth Day of July, 1994

Attest:

BRUCE LEHMAN

*Attesting Officer*  *Commissioner of Patents and Trademarks*